Sept. 16, 1924.
G. STRANDT
MILK BOTTLING MACHINE
Filed April 14, 1922
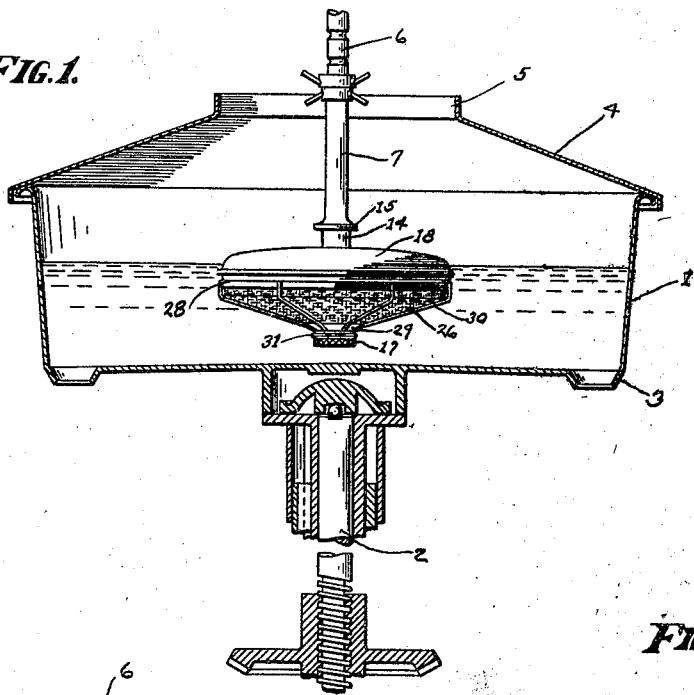
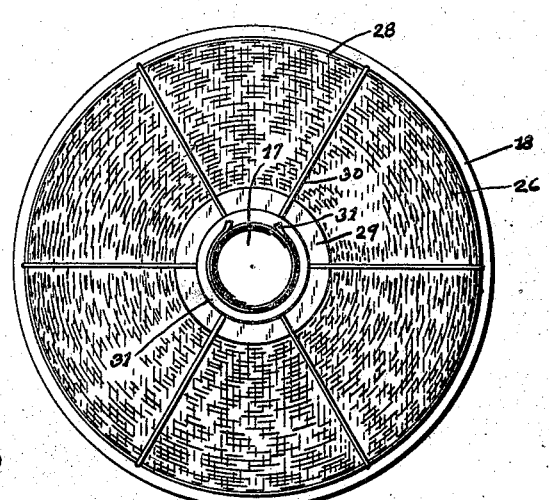
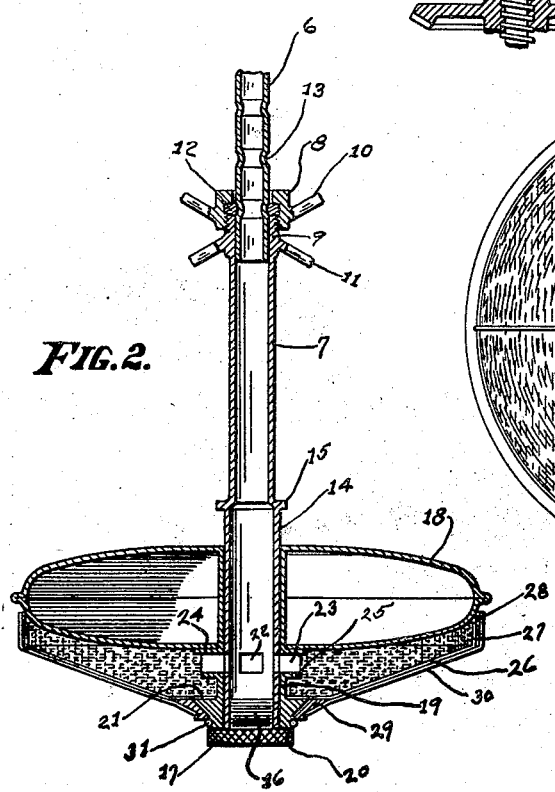
INVENTOR.
Gustav Strandt
BY
ATTORNEYS.

Patented Sept. 16, 1924.

1,508,903

UNITED STATES PATENT OFFICE.

GUSTAV STRANDT, OF MILWAUKEE, WISCONSIN, ASSIGNOR TO MILWAUKEE DAIRY SUPPLY CO., OF MILWAUKEE, WISCONSIN, A CORPORATION OF WISCONSIN.

MILK-BOTTLING MACHINE.

Application filed April 14, 1922. Serial No. 552,746.

*To all whom it may concern:*

Be it known that I, GUSTAV STRANDT, a citizen of the United States, residing at Milwaukee, county of Milwaukee, and State of Wisconsin, have invented new and useful Improvements in Milk-Bottling Machines, of which the following is a specification.

This invention relates to milk bottling machines and is particularly directed to means for controlling the flow of milk in the machine in accordance with the demands of the machine.

This invention is an improvement over my former invention disclosed in application No. 360,562, filed Feb. 24, 1920, and has in general the same objects as those enumerated in such application.

Further objects of this invention are to provide means for delivering milk to a tank or other container and for straining milk while it is being delivered; to provide means whereby the strainer may be directly attached to a controlling float beneath which the milk is delivered; to provide means for permitting the ready removal of the screen; to provide means for bracing and rigidly holding the screen in place; and to provide means for effecting a secure fit between the screen and the float.

Further objects are to provide means for temporarily closing the lower end of the delivery pipe and at the same time retaining the float against dropping downwardly beyond its bottom position; to provide means whereby the ready cleansing both of the delivery pipe and of the screen and float may be secured by allowing a complete detaching of the float from the screen and from the delivery pipe; and to provide such combined float and screen of a simple and cheap construction which may be readily manufactured.

An embodiment of the invention is shown in the accompanying drawings, in which:

Fig. 1 is a vertical sectional view through the tank showing the combined screen and float in position.

Fig. 2 is a sectional view through the screen, float and delivery pipe, such figure being upon a larger scale than Fig. 1.

Fig. 3 is a bottom view of the structure shown in Fig. 2.

The tank 1 is adjustably and rotatably carried upon a screw 2 and is provided with a plurality of outlets 3 in a well known manner. It may be covered by a hood 4 provided with a relatively large central aperture 5. The supply pipe 6 extends downwardly through the aperture 5 and out of contact with the top 4 and is provided with a removable extension 7 secured to the supply pipe by means of a packing nut or gland 8 which is screw threaded to an enlarged portion 9 of the extension 7 of the supply pipe. The nut 8 and thickened, or enlarged, portion 9 may be provided with outwardly projecting handles 10 and 11, respectively, to provide for their ready manipulation. A gasket 12 is positioned between the nut and the upper end of the pipe 7 and is adapted to be forced into grooves or depressed portions 13 formed in the main supply pipe 6 to thereby support the extension 7 in correct adjusted position. The lower portion of supply pipe 7 is provided with an enlarged cylindrical part 14 terminating in an upper shoulder 15. This cylindrical portion is internally threaded at its lower end and a plug 16 provided with a bottom knurled flange 17 is screwed into such lower portion as may be seen from Fig. 2.

The float 18 comprises a relatively flat, hermetically sealed, hollow body having curved upper and lower surfaces. It is equipped with a downwardly extending sleeve 19 which terminates in a thickened bottom portion 20. At an intermediate point in this sleeve, a collar 21 is formed, such collar having a flat upper surface and a conical lower surface. It is to be noted that when the float is in its lowest position the enlarged bottom portion 20 rests against the upper side of the knurled nut or thumb portion 17 of the plug 16 and is thereby prevented from dropping downwardly out of place. Its upper limit of motion is determined by the shoulder 15.

A plurality of apertures 22 are formed in the cylindrical portion 14 of the supply pipe and aligning apertures 23 are formed in the sleeve 19. Above and below the apertures 23, a pair of outwardly projecting rings 24 and 25, respectively, are positioned. These flanges or rings direct the milk outwardly and prevent frothing and unnecessary eddying. Also, the effect of these flanges is to confine the outwardly flowing milk within certain prescribed limits. One effect of this construction is the slowing down of the outwardly flowing stream of milk as the cross sectional area of successive concentric portions between the flanges 24 and 25 is constantly increasing as the external periphery is approached. In other words, an increased cross sectional area of flowing stream is provided as it passes outwardly beyond the apertures 22 and 23. Inasmuch as the volume of milk passing successive sections is constant and inasmuch as the sections are of constantly increasing area, it necessarily follows that the velocity of the outwardly flowing milk is gradually retarded so that it does not squirt outwardly and produce foaming or eddies.

A screen having a conical portion 26 and a cylindrical portion 27 is positioned immediately beneath the float. This screen is provided with an upper annular strengthening band 28 soldered thereto and has its lower end soldered to an internally and externally conically contoured member 29, the inner surface of such member fitting the conical under surface of the shoulder 21 as will be seen from Fig. 2. A plurality of radially disposed reenforcing rods 30 are soldered at their lower ends to the member 29 and at their upper ends to the ring 28. A convenient way of holding this screen temporarily in position is by means of a U-shaped spring member 31 which is positioned immediately below the member 29 and which is seated within an annular groove formed in the portion 20 of the sleeve 19. This member 31 is so positioned that the upper edge of the ring 28 is forced against the curved bottom surface of the float 18, thereby securing a tight and secure fit or joint between the float 18 and the screen 26.

It will be seen that when milk is supplied the tank 1 that the float will gradually rise as the level of the milk rises, and that the apertures 23 will gradually move out of registry with the apertures 22, thereby shutting off the supply of milk. It will also be seen that the outwardly flowing milk is immediately strained before it passes into the body of the tank 1, and mixes with the milk in such tank. It is also to be noted that the screen is of extensive area and that a clogging of one portion will not interfere with the free flow of the milk outwardly to any material extent as would be the case were a relatively small area of screen provided.

It will also be noted that a combined float and screen has been provided for milk bottling machines in which the screen may be readily removed and cleaned and may be as readily replaced. It will also be noted that all of the advantages secured by the construction illustrated in the application referred to hereinbefore will be retained in this construction.

I claim:

1. The combination with a tank, of an upright supply pipe therein closed at its bottom and provided with a lateral port, an annular slide valve guided upon said pipe and adjustable axially thereof to open and close said port, a float operatively connected with the valve, and a screen connected with said valve above and below said port and extending circumferentially about said valve and pipe with a portion projecting radially from said valve, whereby to screen all material passing through said port while attaining an area adequate to ensure against its stoppage.

2. A combined screen and float controlled valve, comprising a pipe through which liquid is adapted to be delivered, a float encircling said pipe and provided with a sleeve accurately fitting said pipe, said pipe and sleeve having cooperating apertures formed therein, and a screen attached to said float and surrounding said apertures.

3. An automatic valve for controlling the flow of a liquid from a supply pipe into a tank, comprising a tube having laterally open apertures therein, means for removably and adjustably supporting said tube in position solely from said supply pipe independently of said tank, a sleeve adapted to slide upon said tube to control the amount of opening of said apertures, a float for controlling the motion of said sleeve, and a screen associated with and spaced from said apertures for screening outwardly flowing liquid from said apertures.

4. An automatic valve for controlling the flow of liquid from a vertical supply pipe, comprising a pipe in communication with said supply pipe and having a plurality of laterally open apertures therein, a float encircling said last mentioned pipe and having a sleeve cooperating with said pipe to control the amount of opening of said apertures, and a screen carried by said float and sleeve and positioned around said apertures and spaced therefrom.

5. An automatic valve for controlling the flow of a liquid from a supply pipe into a tank comprising a pipe in communication with said supply pipe and having a plurality of apertures therein, a sleeve surrounding said last mentioned pipe and having registering apertures, a float mounted upon said sleeve, a screen in contact with said float and extending from said float to adjacent the lower end of said sleeve and positioned around said apertures, and means for detachably retaining said screen in position.

6. An automatic valve for controlling the flow of a liquid from a supply pipe com-